United States Patent
Kakeya et al.

(10) Patent No.: US 9,969,839 B2
(45) Date of Patent: May 15, 2018

(54) POLYFUNCTIONAL URETHANE (METH)ACRYLATE AND CURABLE RESIN COMPOSITION THEREOF

(71) Applicant: MITSUBISHI GAS CHEMICAL COMPANY, INC., Tokyo (JP)

(72) Inventors: Humiaki Kakeya, Tokyo (JP); Takahiro Matsumoto, Tokyo (JP); Katsuyuki Murai, Kanagawa (JP); Tetsuji Moroiwa, Kanagawa (JP); Yasuhiro Maeda, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 25 days.

(21) Appl. No.: 15/037,137

(22) PCT Filed: Nov. 18, 2014

(86) PCT No.: PCT/JP2014/080421
§ 371 (c)(1),
(2) Date: May 17, 2016

(87) PCT Pub. No.: WO2015/076231
PCT Pub. Date: May 28, 2015

(65) Prior Publication Data
US 2016/0297920 A1 Oct. 13, 2016

(30) Foreign Application Priority Data

Nov. 22, 2013 (JP) .................................. 2013-242180

(51) Int. Cl.
| | | |
|---|---|---|
| C08G 18/67 | (2006.01) | |
| C09D 175/16 | (2006.01) | |
| C08G 18/32 | (2006.01) | |
| C08G 18/75 | (2006.01) | |
| C08F 290/06 | (2006.01) | |

(52) U.S. Cl.
CPC .......... C08G 18/673 (2013.01); C08F 290/06 (2013.01); C08G 18/3215 (2013.01); C08G 18/758 (2013.01); C09D 175/16 (2013.01)

(58) Field of Classification Search
CPC ............... C08F 290/06; C08F 290/067; C08G 18/3215; C08G 18/673; C08G 18/758; C09D 175/16

USPC ................................... 428/423.1; 528/59, 65
See application file for complete search history.

(56) References Cited

U.S. PATENT DOCUMENTS

| | | | | |
|---|---|---|---|---|
| 4,544,624 A | * | 10/1985 | Nanpei .................. | C08F 283/00 430/281.1 |
| 2003/0210879 A1 | * | 11/2003 | Oshio ................ | C08G 18/4854 385/128 |
| 2003/0229194 A1 | | 12/2003 | Nomura et al. | |
| 2007/0148519 A1 | * | 6/2007 | Abe ..................... | H01M 8/1027 429/483 |
| 2010/0189937 A1 | | 7/2010 | Ogawa et al. | |

FOREIGN PATENT DOCUMENTS

| | | |
|---|---|---|
| JP | 58-147415 | 9/1983 |
| JP | 2000-191710 | 7/2000 |
| JP | 2001-2742 | 1/2001 |
| JP | 2002-226559 | 8/2002 |
| JP | 2004-10655 | 1/2004 |
| JP | 2006-291148 | 10/2006 |
| JP | 2008-150484 | 7/2008 |
| JP | 2009-286972 | 12/2009 |
| JP | 2011-12145 | 1/2011 |
| JP | 2011-42712 | 3/2011 |
| JP | 2013-108009 | 6/2013 |
| WO | 2009/014162 | 1/2009 |

OTHER PUBLICATIONS

International Search Report issued in Japanese Patent Application No. PCT/JP2014/080421, dated Feb. 24, 2015.

* cited by examiner

*Primary Examiner* — Thao T Tran
(74) *Attorney, Agent, or Firm* — Greenblum & Bernstein, P.L.C.

(57) ABSTRACT

In a resin film configured to have a cured product layer formed from a curable resin composition on the surface of a substrate, the present invention aims to ensure not only the processability and other properties of the resin, but also the performance required for recent high-hardness coating films. The above problem was solved by a curable resin composition comprising the intended polyfunctional urethane (meth)acrylate oligomer, which is capable of forming a cured product layer when applied to and cured on a resin substrate.

7 Claims, 2 Drawing Sheets

[Fig.1]
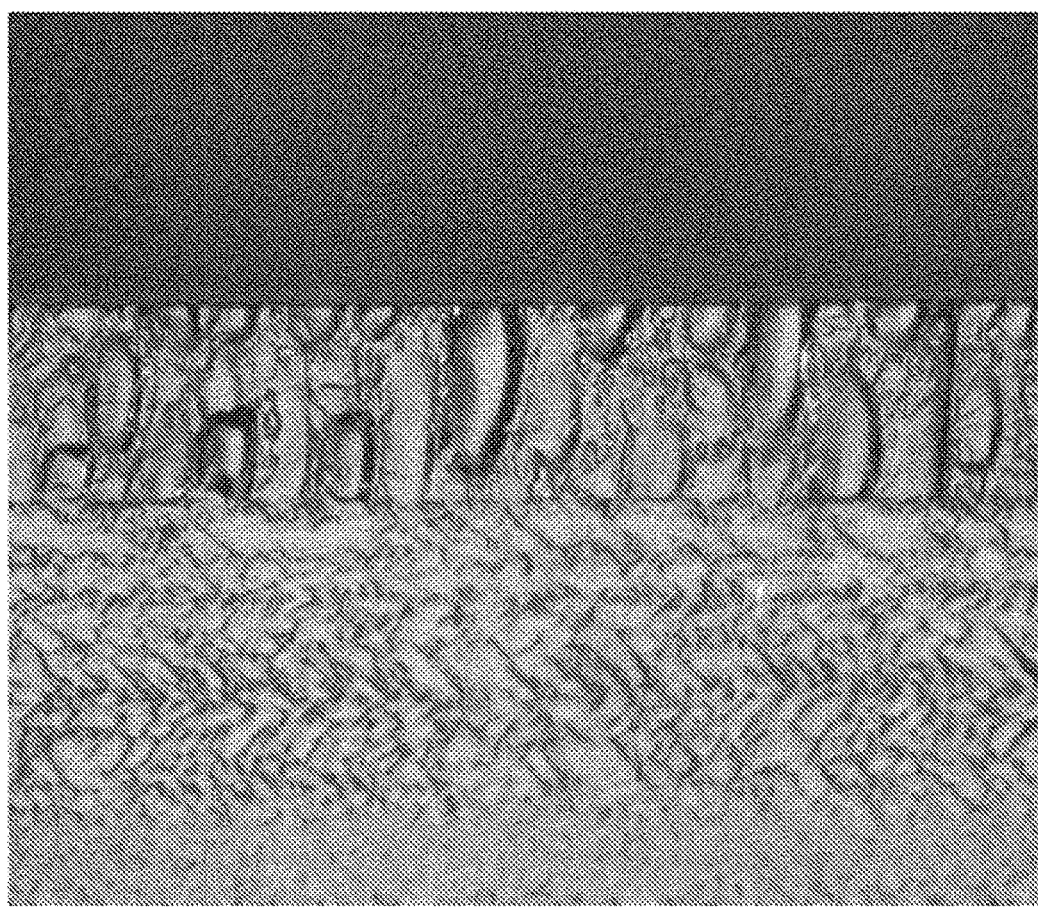

[Fig.2]

POLYFUNCTIONAL URETHANE (METH)ACRYLATE AND CURABLE RESIN COMPOSITION THEREOF

TECHNICAL FIELD

The present invention relates to a novel polyfunctional urethane (meth)acrylate, particularly a curable polyfunctional urethane (meth)acrylate oligomer which can be cured with active energy rays or the like, a curable resin composition, a cured coating as a cured product or resin molded article thereof, and a protective coating for plastic substrates.

BACKGROUND ART

Optical films are generally used as protective films for optical components, and they are provided on one or both surfaces with a hard coat layer to prevent flaws on their surface due to handling during their production and/or to prevent flaws made by a user when used on the outermost surface.

Flaws made by a user include, for example, flaws caused when a mobile phone such as a smartphone having a display on its front side and a metal key are put together into a pocket where the metal key rubs against the surface of the display. For the purpose of preventing such flaws, hard coat layers have been particularly required to have high mar resistance and high pencil hardness in recent years.

With these circumstances as a background, organic-inorganic hybrid type curable resin compositions have been developed using inorganic fillers typified by colloidal silica and fine dry silica particles, as found in Patent Documents 1 to 4 and elsewhere. In particular, as described in Patent Document 5, organic materials have been regarded as being inapplicable to recent high-hardness coating films.

PRIOR ART DOCUMENTS

Patent Documents

Patent Document 1: JP 2013-108009 A
Patent Document 2: JP 2011-012145 A
Patent Document 3: JP 2009-286972 A
Patent Document 4: JP 2008-150484 A
Patent Document 5: JP 2000-191710 A

SUMMARY OF THE INVENTION

Problem to be Solved by the Invention

As described above, organic-inorganic hybrid type curable resin compositions have been developed to satisfy the recent high requirements for mar resistance and hardness in resin films, but there is a serious problem in this attempt. Namely, when inorganic materials (e.g., silica) are used to achieve higher hardness, these inorganic materials will impair processability and other characteristics inherent to resins.

For example, when a film is cut into a given size, fine cracks will develop on the cut surface. This is because coating films modified to have higher hardness with the use of inorganic materials (e.g., silica) will have properties close to those of glass, and hence this is a natural consequence of using cured products based on conventional organic-inorganic hybrids.

The present invention aims to ensure not only the processability and other properties inherent to resins, but also the performance required for recent high-hardness coating films.

Means to Solve the Problem

As a result of extensive and intensive efforts, the inventors of the present invention have found that the above problem can be solved by an oligomer shown in the following formula 1 and a curable resin composition comprising the same. More specifically, the present invention is as follows.

I. A polyfunctional urethane (meth)acrylate oligomer represented by formula 1:

[Chemical Formula 1]

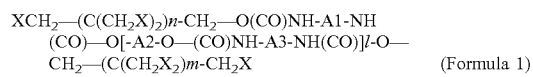

(Formula 1)

(in formula 1, X represents a (meth)acryloyloxy group, A1 and A3 each represent the deisocyanated residue of a cycloaliphatic diisocyanate, provided that at least one of them is the deisocyanated residue of norbornane diisocyanate, A2 represents the dehydroxylated residue of metaxylylene glycol, and n, m and l are each a natural number).

II. The polyfunctional urethane (meth)acrylate oligomer according to I above, which has a polystyrene-converted number average molecular weight of 900 to 30,000.

III. A curable resin composition comprising 40% by mass or more of the polyfunctional urethane (meth)acrylate oligomer according to I or II above.

IV. A curable resin composition comprising 1 to 10 parts by mass of a photopolymerization initiator relative to 100 parts by mass of the curable resin composition according to III above.

V. A cured product obtainable by irradiating the curable resin composition according to III or IV above with active energy rays.

VI. The cured product according to V above, wherein the active energy rays are ultraviolet rays.

VII. A resin molded article obtainable by applying the curable resin composition according to III or IV above onto a resin substrate at a thickness of 5 to 200 μm and irradiating active energy rays to form the cured product according to V or VI above on the substrate surface.

BRIEF DESCRIPTION OF THE DRAWINGS

FIG. 1 shows a cross-sectional view of the film prepared in Example 1 on which a cured product was formed.

FIG. 2 shows a cross-sectional view of the film prepared in Comparative Example 7 on which a cured product was formed.

DESCRIPTION OF EMBODIMENTS

The polyfunctional urethane (meth)acrylate oligomer of the present invention may be represented by formula 1.

[Chemical Formula 2]

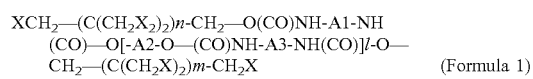

(Formula 1)

X in formula 1 represents a (meth)acryloyloxy group.

l in formula 1 is not limited in any way as long as it is a natural number, but it is desirably 3 or more. A number lower than this range is not desirable because shrinkage on curing is more likely to occur. Although there is no particular limitation on its upper limit, when l is an extremely large number, the viscosity will be increased. For this reason, the upper limit is desirably less than 50, more desirably less than 30, and even more desirably less than 10. Likewise, there is also no particular limitation on the upper limit for molecular weight, but it is desirably set to a polystyrene-converted number average molecular weight of less than 30,000, desirably less than 10,000, more desirably less than 5,000, and most desirably less than 3,000 for the same reason.

Moreover, the molecular weight of the polyfunctional urethane (meth)acrylate oligomer of the present invention is set to a polystyrene-converted number average molecular weight of 900 or more, desirably 920 or more, and more desirably 950 or more.

It should be noted that the oligomer of the present invention is more desirably in the form of a mixture of several oligomers having different values of l, in terms of hardness and reduced shrinkage on curing.

Moreover, the polyfunctional urethane (meth)acrylate oligomer of the present invention has a viscosity of 5 Pa·sec to 50 Pa·sec, desirably 10 Pa·sec to 35 Pa·sec, and more desirably 19 Pa·sec to 25 Pa·sec in a state being diluted with 90% by mass of an MEK solution.

n and m in formula 1 are not limited in any way as long as they are each a natural number, but n and m are each desirably 3 or less, and more desirably 2 or less. A number greater than this range is more likely to enhance shrinkage on curing.

A1 and A3 each represent the deisocyanated group of a cycloaliphatic diisocyanate. At least one of them is the deisocyanated residue of norbornane diisocyanate among the deisocyanated residues of cycloaliphatic diisocyanates. The other deisocyanated residue of a cycloaliphatic isocyanate to be used in combination may be exemplified by the deisocyanated residues of isophorone diisocyanate, cyclohexane diisocyanate, tetramethylenexylylene diisocyanate, dicyclohexylmethane diisocyanate, hydrogenated xylylene diisocyanate and so on. Among these deisocyanated residues of cycloaliphatic diisocyanates, it is particularly desired that A1 and A3 are each the deisocyanated residue (Formula 4) of norbornane diisocyanate

[Chemical Formula 3]

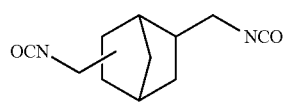

[Chemical Formula 4]

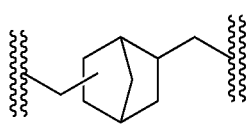

A2 in formula 1 is the dehydroxylated residue (Formula 6) of metaxylylene glycol (Formula 5).

[Chemical Formula 5]

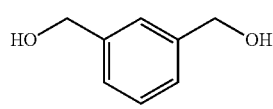

[Chemical Formula 6]

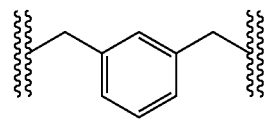

The dehydroxylated residues of aliphatic diols and par-axylylene glycol are not desirable because the hardness will be reduced. Likewise, the dehydroxylated residue of orthoxylylene is also not desirable because shrinkage on curing will be more serious.

The polyfunctional urethane (meth)acrylate oligomer of the present invention may be synthesized in the following manner.

Namely, the following starting material, i.e., a polyfunctional urethane (meth)acrylate monomer represented by formula 2, which has one hydroxyl group:

[Chemical Formula 7]

$$XCH_2-(C(CH_2X_2)n\text{-}CH_2-OH \qquad (Formula\ 2)$$

(in formula 2, n represents a natural number and X represents a (meth)acryloyloxy group, i.e., $CH_2=CR-COO-$ (Formula 8))

[Chemical Formula 8]

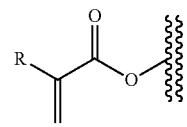

(wherein R is a hydrogen atom or a methyl group) and the above cycloaliphatic diisocyanate and metaxylylene glycol are blended with a polymerization catalyst to cause a polycondensation reaction, whereby the intended oligomer is synthesized. It should be noted that the value of n is as defined in formula 1 and is not limited in any way, although n and m are each desirably 3 or less, and more desirably 2 or less.

The curable resin composition of the present invention comprising a polyfunctional urethane (meth)acrylate oligomer contains the above polyfunctional urethane (meth) acrylate oligomer represented by (formula 1) in an amount of 40% by mass or more, desirably 60% by mass or more, and even more desirably 80% by mass or more.

The curable resin composition of the present invention may optionally comprise a (meth)acrylate monomer(s) for the purpose of viscosity adjustment, etc.

Examples of a monomer to be used for this purpose include monofunctional monomers [e.g., 2-ethylhexyl (meth)acrylate, isodecyl (meth)acrylate, isooctyl (meth)acrylate, benzyl (meth)acrylate, cyclopentanyl (meth)acrylate, cyclohexyl (meth)acrylate, dicyclopentenyl (meth)acrylate, isobonyl (meth)acrylate], bifunctional monomers [e.g., 1,3-butanediol di(meth)acrylate, 1,4-butanediol di(meth)acrylate, 1,6-hexanediol di(meth)acrylate, diethylene glycol di(meth)acrylate, neopentyl glycol di(meth)acrylate, tripropylene glycol di(meth)acrylate, glycerol di(meth)acrylate, allyl (meth)acrylate, epichlorohydrin-modified 1,6-hexanediol acrylate, triglycerol diacrylate], trifunctional or higher functional (meth)acrylates [e.g., trimethylolpropane tri(meth)acrylate, ethylene oxide-modified trimethylolpropane tri(meth)acrylate, propylene oxide-modified trimethylolpropane tri(meth)acrylate, dipentaerythritol hexa(meth) acrylate, epichlorohydrin-modified trimethylolpropane tri(meth)acrylate, trivinylbenzene, trivinylcyclohexane, ditrimethylolpropane tetra(meth)acrylate, glycerol tri(meth)acrylate] and so on, which may be used either alone or in combination.

The content of the (meth)acrylate monomer(s) in the curable resin composition is 5% to 60% by mass, and desirably 10% to 50% by mass.

Moreover, the curable resin composition of the present invention may also comprise a solvent in addition to the polyfunctional urethane (meth)acrylate oligomer and the (meth)acrylate monomer(s) optionally added. Examples of a solvent used for this purpose include highly volatile organic solvents, as exemplified by ketones (e.g., methyl ethyl ketone, methyl isobutyl ketone), glycol ethers (e.g., methoxypropanol propylene glycol monomethyl ether), etc. Such a solvent may be used in an amount of 10% to 50% by mass, desirably 15% to 30% by mass.

It should be noted that the resin composition of the present invention may further comprise an antioxidant, a UV absorber, a light stabilizer, a leveling agent, a pigment, an inorganic filler, an organic filler, an organic solvent and so on.

The cured product of the present invention can be obtained by applying the above curable resin composition onto a substrate and irradiating active energy rays (e.g., ultraviolet rays, electron beams) to cure the coating film.

Examples of a substrate include plastic films made of polypropylene resin, polycarbonate resin, polyethylene resin, polyethylene terephthalate resin, polyethylene naphthalate resin, polymethyl methacrylate resin, polystyrene resin and so on. Such a substrate may be of any shape. In the case of a film-shaped substrate, its thickness is generally around 10 to 500 μm, and preferably 20 to 200 μm.

For application purposes, any technique may be used and examples include gravure coating, reverse coating, die coating, lip coating, blade coating, roll coating, roll coating, knife coating, curtain coating, slot orifice coating, spray coating, ink jet coating and so on.

When the active energy rays are ultraviolet rays, a source of the energy rays may be exemplified by a high pressure mercury lamp, a metal halide lamp, etc., and the irradiation energy is generally around 100 to 2,000 mJ/cm$^2$.

On the other hand, when the active energy rays are electron beams, there is no particular limitation on their source and irradiation mode (e.g., scanning-type electron beam irradiation, curtain-type electron beam irradiation), and the irradiation energy is generally around 10 to 200 kGy.

When cured with ultraviolet rays, the curable resin composition is required to comprise a photopolymerization initiator, which is not needed when the active energy rays used for obtaining the above cured product are electron beams.

Such a photopolymerization initiator is not limited in any way and any known photopolymerization initiator may be used for this purpose. More specifically, examples include 1-hydroxy-cyclohexyl-phenyl ketone, 2,2-dimethoxy-1,2-diphenylethan-1-one, 1-cyclohexyl phenyl ketone, 2-hydroxy-2-methyl-1-phenyl-propan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)-butanone-1, bis(2,4,6-trimethylbenzoyl)-phenylphosphine oxide, 2,4,6-trimethylbenzoyl-diphenyl-phosphine oxide, 4-methylbenzophenone and so on, which may be used either alone or in admixture.

The amount of a photopolymerization initiator(s) to be used is not limited in any way, but it is preferably set to generally around 1 to 10 parts by mass, preferably 1 to 7 parts by mass, and more preferably 3 to 5 parts by mass, relative to 100 parts by mass of the above curable resin composition.

When the above curable resin composition is applied onto a substrate and cured, e.g., by being irradiated with active energy rays, the thickness of the cured coating film is not limited in any way, but it is desirably 5 to 200 μm, more desirably 10 to 100 μm, and most desirably 40 to 100 μm.

If the cured coating film is thinner than this range, sufficient hardness cannot be obtained. On the other hand, if the cured coating film is thicker than this range, poor curing is more likely to occur, which is not desirable.

EXAMPLES

The present invention will be further described in more detail by way of the following examples and comparative examples, which are not intended to limit the scope of the invention.

It should be noted that parts and % in the following examples and comparative examples are intended to mean parts by mass and % by mass, respectively, unless otherwise specified.

Example 1

A five-necked flask equipped with a stirring unit, a thermometer, a condenser, a dropping funnel and a dry air inlet tube was flushed in advance with dry air to dry the interior of the system, and then charged with 100 parts by mass of norbornene diisocyanate, 271.2 parts by mass of a mixture consisting of 56% pentaerythritol triacrylate and 44% pentaerythritol tetraacrylate, 33.5 parts by mass of metaxylylene glycol, and 101.2 parts by mass of 2-butanone as a solvent, followed by heating to 60° C. Subsequently, the flask was charged with 0.08 parts by mass of dibutyltin dilaurate as a polymerization catalyst and 0.16 parts by mass of dibutylhydroxytoluene as a polymerization inhibitor, and then cooled such that the temperature after heat generation was 80° C. to 90° C., followed by infrared absorption spectroscopy to confirm that the isocyanate residues in the reaction mixture had been consumed, thereby obtaining a 2-butanone solution of a hexafunctional urethane acrylate oligomer in an amount of 506.1 parts by mass (solid content concentration: 80%). An aliquot of the resulting solution was dried up and the solid content was diluted to 10 mg/ml with chloroform. A liquid chromatographic system (LC-20AD, Shimadzu Corporation, Japan) was connected with a GPC column (Jordi Gel DVB 500 Å) to conduct GPC measurement. As a result, the resulting oligomer was found to have a polystyrene-converted number average molecular weight of 2747.

Relative to 100 parts by mass of this hexafunctional urethane acrylate oligomer, 20 parts by mass of methyl ethyl ketone and 4 parts by mass of 1-hydroxy-cyclohexyl-phenyl ketone (I-184, BASF) as a photopolymerization initiator were mixed to obtain a curable composition for which ultraviolet rays were used as active energy rays.

<Application and Curing>

This curable resin composition was applied with a bar coater onto the surface of a polycarbonate film of 200 μm thickness and dried at 50° C. for 1 minute. This polycarbonate film, on which the curable resin composition was applied, was irradiated with ultraviolet rays at an accumulated exposure amount of 500 mJ/cm² using a high pressure mercury lamp to form a cured product on the surface of the polycarbonate film, i.e., to obtain a hard coat film.

The resulting hard coat film was cut into a 10 cm square piece, which was then fixed with a cellophane tape at its four corners on a glass plate and measured for its surface pencil hardness in accordance with JIS K 5600-5-4 (1999) by using a pencil scratch tester for coated film. The surface pencil hardness was found to be 8H.

As a result of cross-sectional observation, the cured product was found to have a thickness of 40 μm. As shown in FIG. 1, it should be noted that no fracture-induced defect was detected in the film of Example 1 on which a layer of the cured product was formed.

Ultrafine #0000 steel wool (fiber diameter: about 0.012 mm) was contacted under a load of 100 gf/cm² with the surface of the cured product on the polycarbonate film placed horizontally. After 15 times reciprocating abrasion, a change in the haze value (cloudiness) before and after the abrasion was determined. Before and after the abrasion, there was no occurrence of flaws and the haze value remained unchanged.

Example 2

The same procedure as shown in Example 1 was repeated to form a cured product on the surface of a polycarbonate film, except that the amount of methyl ethyl ketone to be mixed with the hexafunctional urethane acrylate oligomer was changed from 20 parts by mass in Example 1 to 50 parts by mass.

In the same manner as shown in Example 1, the cured product was measured for its thickness, cross-sectional state and surface pencil hardness and for a change in its haze value (cloudiness) before and after abrasion with #0000 steel wool.

The thickness was found to be 20 μm, and the cured product showed no fracture-induced defect in its cross-section. The surface pencil hardness was found to be 2H. The haze value remained unchanged.

Comparative Example 1

The same procedure as shown in Example 1 was repeated, except that 100 parts by mass of norbornane diisocyanate in Example 1 was replaced with 92.8 parts by mass of isophorone diisocyanate.

The thickness was found to be 40 μm, and the resulting cured product showed no fracture-induced defect in its cross-section. The surface pencil hardness was found to be 4H, although flaws developed after steel wool abrasion and the haze value was found to increase by 1%.

Comparative Example 2

The same procedure as shown in Example 2 was repeated, except that 100 parts by mass of norbornane diisocyanate in Example 2 was replaced with 92.8 parts by mass of isophorone diisocyanate.

The thickness was found to be 10 μm, and the resulting cured product showed no fracture-induced defect in its cross-section. However, the surface pencil hardness was found to be B. Flaws developed after steel wool abrasion and the haze value was found to increase by 1%.

Comparative Example 3

The same procedure as shown in Example 1 was repeated to obtain a hexafunctional urethane acrylate oligomer, except that 100 parts by mass of norbornane diisocyanate in Example 1 was replaced with 109.6 parts by mass of metaxylene diisocyanate. However, the resulting oligomer was in solid form not soluble in methyl ethyl ketone, thereby giving up the preparation of a curable resin composition and the formation and evaluation of a cured product.

Comparative Example 4

The same procedure as shown in Example 1 was repeated, except that 33.5 parts by mass of metaxylylene glycol in Example 1 was replaced with 33.5 parts by mass of paraxylene glycol.

The thickness was found to be 40 μm, and the resulting cured product showed no fracture-induced defect in its cross-section. The surface pencil hardness was found to be 2H. The haze value remained unchanged.

Comparative Example 5

The same procedure as shown in Example 1 was repeated, except that 33.5 parts by mass of metaxylylene glycol in Example 1 was replaced with 33.5 parts by mass of orthoxylene glycol.

Immediately after the formation of a cured product on a polycarbonate film, cracks developed and hence the evaluation of pencil hardness and others was given up.

Comparative Example 6

The same procedure as shown in Example 1 was repeated, except that 33.5 parts by mass of metaxylylene glycol in Example 1 was not charged. Immediately after the formation of a cured product on a polycarbonate film, cracks developed and hence the evaluation of pencil hardness and others was given up.

Comparative Example 7

A reactor equipped with a stirring unit, a condenser tube, a dropping funnel and a nitrogen inlet tube was charged with 480 parts by mass of methyl isobutyl ketone and heated under stirring conditions until the temperature within the system reached 110° C. Then, a mixture consisting of 130 parts by mass of glycidyl methacrylate, 304 parts by mass of methyl methacrylate and 15 parts by mass of t-butyl peroxy-2-ethylhexanoate ("Perbutyl O"; Nippon Nyukazai Co., Ltd., Japan) was added dropwise over 3 hours through the dropping funnel, followed by maintaining the reactor at 110° C. for 15 hours. Then, after cooling to 90° C., the reactor was charged with 0.1 parts by mass of methoquinone and 66 parts by mass of acrylic acid, followed by addition of 5 parts by mass of triphenylphosphine. The reactor was further heated to 100° C. and maintained for 8 hours to obtain a methyl isobutyl ketone solution of an acryl polymer (X-2) in an amount of 1000 parts by mass (nonvolatile content: 50.0% by mass).

20 parts by mass of this methyl isobutyl ketone solution of the acryl polymer (the acryl polymer (X-2) accounts for 10.0 parts by mass in 20 parts by mass) was blended with 45 parts by mass of dipentaerythritol hexaacrylate (d-1), 45 parts by mass of fine silica particles having a primary average particle size of 12 nm and having (meth)acryloyl groups on the particle surface ("Aerosil R7200"; Nippon Aerosil Co., Ltd., Japan), 80 parts by mass of methyl isobutyl ketone and 10 parts by mass of propylene glycol monomethyl ether to give a slurry with a nonvolatile content of 50%, which was then mixed and dispersed with a homogenizer to obtain an organic-inorganic hybrid curable resin composition.

Using this composition, the same procedure as shown in Example 1 was repeated to form a cured product on the surface of a polycarbonate film.

The thickness was found to be 40 μm. As shown in FIG. 2, cracks developed upon cutting the film of Comparative Example 7 on which a layer of the cured product was formed, and crack-induced defects were detected in the layer of the cured product. The surface pencil hardness was found to be HB. The haze value remained unchanged.

Reference Example

The polycarbonate film of 200 μm thickness used as a substrate in the above examples and comparative examples was measured for its pencil hardness and for a change in its haze value after steel wool test in the same manner as shown in Example 1. As already described, polycarbonate per se is a material which is very easily flawed.

In consequence of this, the surface pencil hardness was found to be 2B and the haze value was found to increase by 40% after steel wool test.

The results of these examples, comparative examples and reference example are summarized in Table 1.

TABLE 1

|  | Cross-sectional observation | Film thickness (mm) | Pencil hardness | Change in haze value after abrasion |
|---|---|---|---|---|
| Example 1 | good | 40 | 8H | 0% |
| Example 2 | good | 20 | 2H | 0% |
| Comparative Example 1 | good | 40 | 4H | 1% |
| Comparative Example 2 | good | 10 | B | 1% |
| Comparative Example 3 | (not applicable due to crystallization) | — | — | — |
| Comparative Example 4 | good | 40 | 2H | 0% |
| Comparative Example 5 | (cracks after UV curing) | — | — | — |
| Comparative Example 6 | (cracks after UV curing) | — | — | — |
| Comparative Example 7 | cracks on the cut surface | 40 | HB | 0% |
| Reference Example | (substrate polycarbonate) | — | 2B | 40% |

Upon comparison of Examples 1 and 2 with Comparative Examples 1, 2 and 3 and Reference Example, it is indicated that an oligomer containing the deisocyanated residue(s) of norbornane diisocyanate is highly effective in increasing pencil hardness and mar resistance.

Upon comparison of Example 1 with Comparative Examples 4, 5 and 6 and Reference Example, it is indicated that the dehydroxylated group of metaxylylene glycol is useful in increasing pencil hardness and crack resistance during curing.

Further, upon comparison of Example 1 with Comparative Example 7 and Reference Example, it is indicated that the curable resin composition of the present invention is more effective in improving pencil hardness and crack resistance during cutting than conventional organic-inorganic hybrid type curable resin compositions.

The invention claimed is:

1. A polyfunctional urethane (meth)acrylate oligomer represented by formula 1:

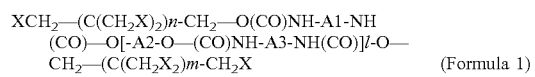

$$XCH_2-(C(CH_2X)_2)n-CH_2-O(CO)NH-A1-NH(CO)-O[-A2-O-(CO)NH-A3-NH(CO)]l-O-CH_2-(C(CH_2X_2)m-CH_2X \quad \text{(Formula 1)}$$

in which X represents a (meth)acryloyloxy group, A1 and A3 each represent the deisocyanated residue of a cycloaliphatic diisocyanate, provided that at least one of them is the deisocyanated residue of norbornane diisocyanate, A2 represents the dehydroxylated residue of metaxylylene glycol, and n, m and l are each a natural number, and
wherein l is from 3 to less than 50, n and m are each 3 or less.

2. The polyfunctional urethane (meth)acrylate oligomer according to claim 1, which has a polystyrene-converted number average molecular weight of 900 to 30,000.

3. A curable resin composition comprising 40% by mass or more of the polyfunctional urethane (meth)acrylate oligomer according to claim 1.

4. A curable resin composition comprising 1 to 10 parts by mass of a photopolymerization initiator relative to 100 parts by mass of the curable resin composition according to claim 3.

5. A cured product obtained by irradiating the curable resin composition according to claim 3 with active energy rays.

6. The cured product according to claim 5, wherein the active energy rays are ultraviolet rays.

7. A resin molded article obtainable obtained by applying the curable resin composition according to claim 3 onto a resin substrate at a thickness of 5 to 200 μm and irradiating active energy rays to form a cured product on the substrate surface.

* * * * *